USOO7942114B2

(12) United States Patent
Hillios et al.

(10) Patent No.: US 7,942,114 B2
(45) Date of Patent: May 17, 2011

(54) UNDERWATER FOOD DELIVERY SYSTEM AND METHOD OF USE

(76) Inventors: Sonia R. Hillios, Southampton, MA (US); Christopher H. Hillios, Southampton, MA (US)

( * ) Notice: Subject to any disclaimer, the term of this patent is extended or adjusted under 35 U.S.C. 154(b) by 1230 days.

(21) Appl. No.: 11/160,792

(22) Filed: Jul. 8, 2005

(65) Prior Publication Data

US 2006/0008559 A1    Jan. 12, 2006

Related U.S. Application Data

(60) Provisional application No. 60/586,271, filed on Jul. 9, 2004.

(51) Int. Cl.
*A01K 61/00* (2006.01)
(52) U.S. Cl. ...................................... 119/230
(58) Field of Classification Search .................. 119/201, 119/230, 51.04; 426/1; 220/754; 215/399
See application file for complete search history.

(56) References Cited

U.S. PATENT DOCUMENTS

| 2,763,956 | A |   | 9/1956  | Olson |
| 2,809,771 | A |   | 10/1957 | Ward |
| 2,846,803 | A |   | 8/1958  | Rettig |
| 3,212,679 | A |   | 10/1965 | Schmidt, Jr. |
| 3,487,575 | A |   | 1/1970  | Jones |
| 3,664,303 | A |   | 5/1972  | Baensch |
| 3,846,931 | A |   | 11/1974 | Block et al. |
| 3,931,414 | A |   | 1/1976  | Popeil |
| 3,958,721 | A | * | 5/1976  | Kushida et al. ............... 222/107 |
| 3,976,413 | A |   | 8/1976  | Popeil |
| 4,083,477 | A |   | 4/1978  | Zetterberg |
| 4,589,223 | A | * | 5/1986  | Hastings ..................... 43/42.24 |
| 4,732,766 | A |   | 3/1988  | Lindgard |
| 4,850,129 | A |   | 7/1989  | Hoepfner et al. |
| 5,140,943 | A |   | 8/1992  | Nearhoff |
| 5,244,135 | A | * | 9/1993  | Nelson ......................... 224/604 |
| 5,356,016 | A | * | 10/1994 | Wiedemann ................. 215/11.3 |
| 5,827,551 | A | * | 10/1998 | Prochnow et al. ............... 426/1 |
| 5,954,012 | A |   | 9/1999  | Jackson |
| 6,109,210 | A |   | 8/2000  | Nasser |
| 6,192,830 | B1 |   | 2/2001  | Lin |
| 6,199,719 | B1 |   | 3/2001  | Bordage |
| 6,283,346 | B1 | * | 9/2001  | Thomas ..................... 224/148.6 |
| 2004/0003531 | A1 |   | 1/2004  | Hulin |

* cited by examiner

*Primary Examiner* — Michael R Mansen
*Assistant Examiner* — Monica L Williams

(57) ABSTRACT

Disclosed herein is a delivery system for the underwater feeding of aquatic life, wherein the delivery system is compact and secured to a user thereby providing ease of use and ready accessibility of the delivery system while the user is engaged in underwater activities. The delivery system further prevents the backwash of water from the aqueous environment into the delivery system when in use. Additionally, the delivery system comprises a food composition for the feeding of the aquatic life that is not readily water soluble and that has a sufficient viscosity such that the food composition will not readily disperse or dissolve when dispensed into the aqueous environment.

1 Claim, 2 Drawing Sheets

US 7,942,114 B2

UNDERWATER FOOD DELIVERY SYSTEM AND METHOD OF USE

CROSS REFERENCE TO RELATED APPLICATIONS

This application claims the benefit of U.S. Provisional Application No. 60/586,271 filed on Jul. 9, 2004.

BACKGROUND OF THE INVENTION

1. Field of the Invention

This invention relates to an underwater food delivery system and method of use. More particularly, this invention relates to a food delivery system and method that facilitates the feeding of aquatic life by users, such as, by swimmers, snorkelers, and scuba divers.

2. Background of the Invention

Part of the enjoyment in engaging in underwater activities, such as swimming and snorkeling, is interacting with the aquatic life. Particularly, enjoyable is feeding aquatic life, such as, for example, fish. Typically, swimmers, snorkelers, and scuba divers feed the fish bread and crackers that the user carries in a plastic bag. However, this method has several drawbacks associated with it. For example, the plastic bags make it difficult to remove the food while the user is underwater. Additionally, the bread and crackers readily dissolve in the water, thereby greatly reducing the timeframe in which the fish can be fed. Also, when the user has finished feeding the fish, oftentimes the user will simply leave the plastic bag in the water, thereby posing a health risk to the aquatic fauna. Accordingly, what is needed is a compact underwater food delivery system to be used by a user when swimming, snorkeling, or engaging in some other underwater activity, wherein the food can be easily removed from or contained within the system, wherein the food contained in the system will not readily dissolve or disperse when in contact with the water, and wherein the system reduces the risk of harm to the environment. Such a delivery system would enhance the enjoyment experienced by a user as, because of the ready and steady distribution of food, and the food's ability to better withstand the aqueous environment, a larger number of aquatic life would be attracted to the delivery system.

SUMMARY OF THE INVENTION

The above-discussed and other drawbacks and deficiencies of the prior art are overcome or alleviated by a delivery system comprising a receptacle for containing a food composition for underwater dispension; a handle secured to the receptacle wherein the handle secures the delivery system to a user; and a gateway secured to the receptacle, wherein the gateway provides for the ingress and egress of the food composition from the receptacle.

DETAILED DESCRIPTION OF THE INVENTION

Figures 1, 2:
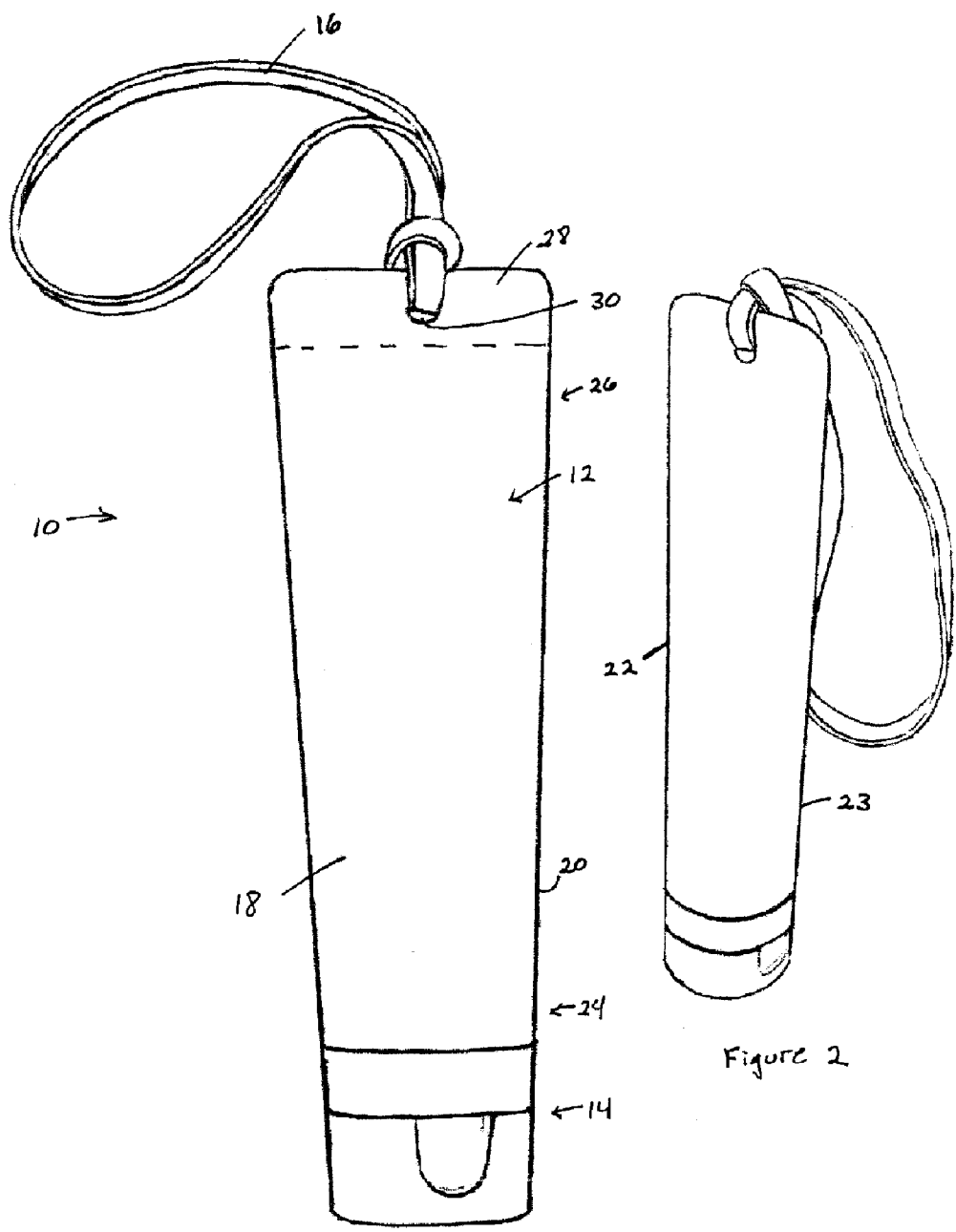
FIG. 1 is a schematic depicting a front view of an exemplary underwater food delivery system.
FIG. 2 is a schematic depicting an elevational side view of the delivery system depicted in FIG. 1.

In general, disclosed herein is an underwater food delivery system capable of distributing fish food underwater in a controlled manner, wherein the food can be used to attract a wide array of aquatic life, particularly fish thereby allowing a user, e.g., a swimmer, a snorkeler or other underwater participator, to directly feed the aquatic life while the user is underwater. As used herein and throughout, underwater refers to the partial or total submersion of the object described in an aqueous environment. Additionally, the term "fish" will be used to refer to an exemplary type of aquatic life to which the delivery system is particularly well adapted; however, it is to be understood that the delivery system may also be used to feed other types of aquatic life, and is, therefore, unless otherwise specified, not limited to fish.

The delivery system comprises a receptacle which contains a food composition. The receptacle comprises an outlet through which the food composition may be dispensed by applying a threshold amount of pressure to the delivery system. Once the threshold pressure is lessened or removed, the leftover food composition remains in the receptacle while a flow of water from the aqueous environment into the receptacle is simultaneously prevented, thereby protecting the integrity of the food composition. The receptacle may comprise any geometrical shape or dimension, wherein the dimensions are determined to allow for the easy and cumbersomeless carry of the delivery system by a user when the user is engaged in underwater activities, and to allow for the easy manipulation of the delivery system when the user desires to feed the aquatic life while the user is underwater. Additionally, the receptacle may comprise a wide variety of materials, wherein the receptacle is preferably waterproof and resistant to alkaline conditions. A particularly preferred receptacle comprises a plastic material, a rubber material, a metallized material, and the like, and combinations comprising at least one of the foregoing.

The delivery system may further comprise a gateway in association with the receptacle, whereby, when open, upon application of the threshold amount of pressure to the system, the food moves from the receptacle to the underwater environment, and when closed, the food remains secured in the receptacle despite the application of the threshold amount of pressure, and prevents the backflow of water into the receptacle. An exemplary gateway comprises, for example, a plunger, an airless pump, a reciprocating piston pump, a one-way valve, a trigger sprayer, and the like, and combinations comprising at least one of the foregoing. Additionally, the gateway may be removable or non-removable from the receptacle. However, where it is desired to reuse the delivery system, e.g., where it is desired to refill an empty or partially empty delivery system with food, then it is preferable that the gateway be removable.

Where the delivery system does not comprise a gateway, it is preferred that the receptacle comprise a non-elastic material, such as a metallized or a laminated metallized material. Accordingly, pursuant to this embodiment, while the food is dispensed in the aquatic environment, the receptacle preferably collapses in shape according to the pressure applied to the receptacle. Once the desired amount of food has been dispensed, the receptacle preferably retains its collapsed shape, thereby preventing water from the aqueous environment from flowing into the receptacle, which would otherwise result should the receptacle spring back into its original shape.

The delivery system further comprises a handle whereby the delivery system is secured to a user. Although the handle may comprise a variety of materials, it is preferred that the handle be made of a waterproof material, and can withstand alkaline conditions. Additionally, the handle is preferably pliable to allow ready manipulation of the delivery system by a user when underwater. Additionally, a pliable material preferably allows the handle to expand and contract over repeated uses thereby facilitating the fish feeding process. In an exemplary embodiment, the handle comprises an elastic material, such as, a rubber band, a bungie cord, and the like; however, the handle may further comprise a rope, a plastic tether, a threaded tether, and the like. In an exemplary embodiment, the receptacle, gateway, and handle are arranged to facilitate the user's underwater feeding of the aquatic life.

In an exemplary embodiment, the delivery system further comprises a phosphorescent material such that the delivery system may be visible at night, which is particularly important, for example, when a user is engaged in night dives. Additionally, this feature has safety/emergency benefits as the light emitted can assist in the search and rescue of a user, for example. The phosphorescent product may be added during the manufacture of the delivery system, or it may be applied to the delivery system after the manufacturing process has been completed, such as, by painting. In a particularly preferred embodiment, the phosphorescent material is added or applied to at least one of the gateway, the receptacle, the handle, and the cap (explained further below) of the delivery system or onto a waterproof disk, label, or other material which can adhere to at least one of the gateway, receptacle, handle, and cover.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to the Figures, an exemplary delivery system 10 comprises a receptacle 12 and a handle 16 in the form of a rubber band or tether. Delivery system 10 further comprises a cover 14 allowing for the egress of the food from receptacle 12. Although cover 14 is shown as a combination screw cap and flip top, it is contemplated herein that receptacle 12 may be opened/closed by a wide variety of covers including, for example, a push top, a twist top, a screw cap, a flip top, and the like, and combinations comprising at least one of the foregoing. It is further contemplated that the cover may comprise a conduit, such as a hole, whereby the food composition may exit the receptacle.

Receptacle 12 comprises a front side 18 opposite to a back side 20, and a first lateral side 22 opposite to a second lateral side 23, wherein lateral sides 22 and 23 join front side 18 to back side 20. As depicted in the Figures, front side 18, back side 20, and the lateral sides, each comprises a top portion 24 and a bottom portion 26, wherein the sides taper outwardly from top portion 24 to bottom portion 26. Bottom portion 26 terminates in a flange 28. In an exemplary embodiment, flange 28 is sealed (as shown by the dashed lines) such that an internal cavity (not shown) formed by front side 18, back side 20, and the lateral sides are closed off by the seal.

Flange 28 comprises a handle securing element comprising a hole 30 through which handle 16 is tied. Although the handle securing element is represented as a hole in the Figures, it is further contemplated that the handle securing element may comprise other fastening means including, for example, a waterproof adhesive, a staple, stitching, and the like, or any other element that can secure the handle to the receptacle.

Figure 3:
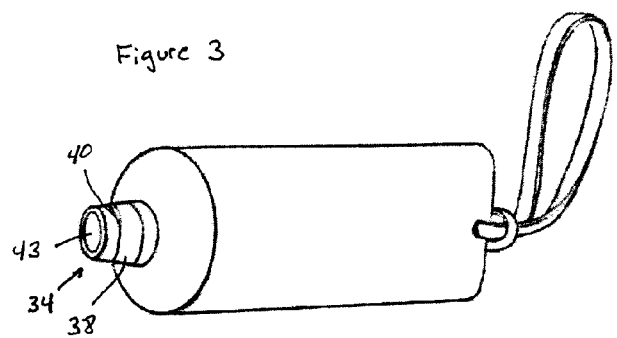
FIG. 3 is a schematic depicting a front view of the delivery system depicted in FIG. 1, wherein a cover is removed.
Figure 4:
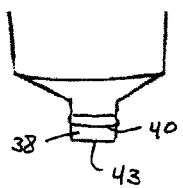
FIG. 4 is a schematic depicting a front view of a top portion of the delivery system depicted in FIG. 1.

Top portion 24 of receptacle 12 tapers inwardly and terminates in a receiver 34 wherein receiver 34 is configured to secure cover 14. As shown in FIG. 3, receiver 34 comprises a raised outlet 38 at the center top side, wherein raised outlet 38 is surrounded by grooves 40 complementary to grooves located on an interior portion of screw cap 14 such that screw cap 14 can be removably secured onto receiver 34.

Figure 5:
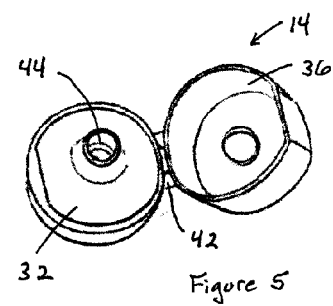
FIG. 5 is a schematic depicting a top view of an exemplary cover.

Referring particularly to FIG. 5, screw cap 14 comprises a base 32 to which a lid 36 is secured by an attachment element 42. Additionally, screw cap 14 comprises a hole 44 which, when screw cap is secured onto receiver 34, aligns with hole 43 (FIG. 3) such that the food can be dispelled from delivery system 10 into the aqueous environment. Although holes 43 and 44 are depicted as circular, it is contemplated herein that the holes may be of any configuration, wherein the configuration is dictated by the desired shape of the food composition when it emerges from the receptacle. For example, the holes may be configured such that the food composition emerges in the shape of worms, ribbons, fluted worms, and the like.

Figure 6:
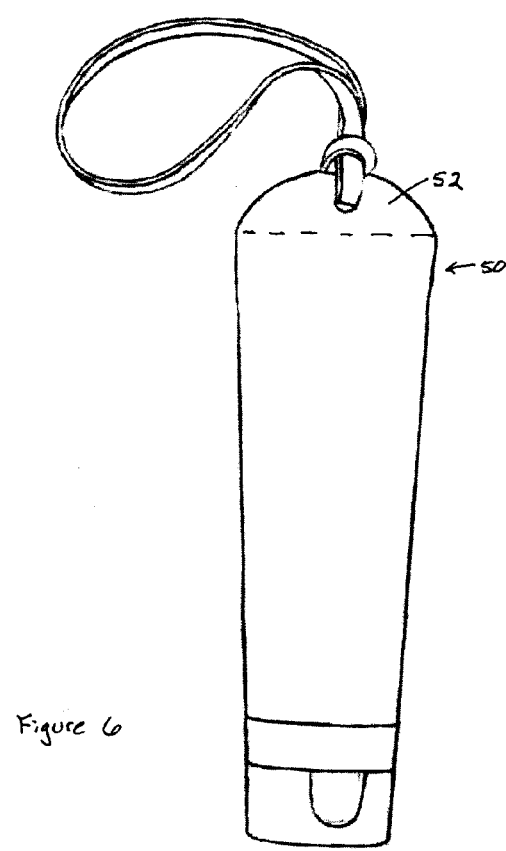
FIG. 6 is a schematic depicting a front view of an exemplary underwater fish food delivery system.
Figure 7:
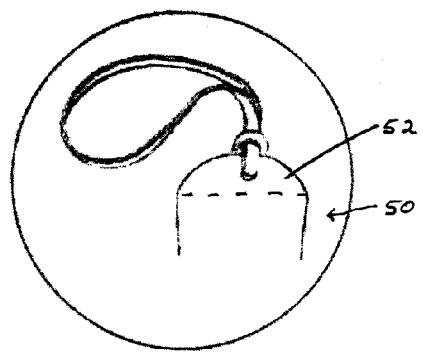
FIG. 7 is a schematic depicting a front view of an exemplary bottom portion of the delivery system depicted in FIG. 6.

FIGS. 6 and 7 depict another exemplary embodiment of the food delivery system of the present invention. Referring to these figures, a bottom portion 50 comprises a flange 52 having an arched geometry as compared to the rounded corners of flange 28. Although the flange may comprise a wide variety of shapes, it is preferred that it not have sharp corner edges so as to reduce the likelihood of injury to a user as a result of the user's contact with the edges.

Referring again to the figures, in an exemplary application of the delivery system 10 and of delivery systems contemplated herein, a user may feed the aquatic life while the user is underwater by flipping lid 36 into an open position (as depicted in FIG. 5), and applying a threshold amount of pressure to the surface of receptacle 12 such that the food contained in receptacle 12 is dispersed from receptacle 12 through hole 43 and through hole 44 into the aqueous environment. When the user is finished with delivery system 10, lid 36 may be flipped into a closed position, thereby preventing any undesired water and contaminants from entering receptacle 12. Additionally, receptacle 12 preferably collapses when used and maintains the collapsed state after use to prevent the flow of water and contaminants into receptacle 12. Where a gateway is employed, pressure may be applied to the gateway to release the food composition, wherein it is contemplated that the gateway is designed to prevent the flow of water and other contaminants into the receptacle. Additionally, a cover may also be disposed on the gateway.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The composition of the food for use in the delivery system contemplated herein may vary widely so long as the composition comprises such a nature that it will not readily dissolve or disperse when dispensed from the delivery system into the aqueous environment. Additionally, the food is preferably in such a form that it can be removed through the outlets formed in the receptacle and, in the optional gateway when a user applies a threshold amount of pressure to the system. Preferably, the food composition comprises a substance(s) of sufficient stability when dispersed into the water such that the aquatic life is attracted to it, and can consume it prior to its dissolution and dispersion. In an exemplary embodiment, the food composition comprises a viscosity of at least 1,000 centipoises, with a viscosity of at least 1,500 centipoises more preferred, and a viscosity of at least 2,000 centipoises especially preferred. Furthermore, in an exemplary embodiment, the food composition comprises a specific gravity of about 1.03 to about 1.09. The type of food which is particularly well adapted for use in the delivery system described herein is a paste, wherein such paste preferably comprises an emulsified oil-based composition.

In an exemplary embodiment, the food comprises ground meals, edible oils or blends of edible oils preferably derived from plant or animal sources (mono-, di-, and tri-glycerides), antioxidants, and flavorings. In an exemplary embodiment, the fish food composition comprises about 20 to about 90 percent of the ground meal, about 29 to about 90 percent of the oil, about 0.1 to about 10 percent of the antioxidant, and about 0.1 to about 5 percent of the flavorings.

Exemplary ground meals include, without limitation, at least one of wheat flour, soybean meal, fish meal, ground corn, spirulina, herring meal, shrimp meal, soybean meal, marine algae, and combinations thereof. Exemplary oils include, without limitation, at least one of soybean oil, hydrogenated soybean oil, safflower oil, sunflower seed oil, palm oil, hydrogenated palm oil, palm kernel oil, peanut oil, coconut oil, hydrogenated coconut oil, cottonseed oil, hydrogenated cottonseed oil, canola oil, hydrogenated canola oil, olive oil, rapeseed oil, wheat germ oil, sweet almond oil, bitter almond oil, corn oil, hydrogenated tallow glycerides, lard glycerides, tall oil, fish oil, hydrogenated fish oil, fish liver oil, egg oil, hydrogenated egg oil, and combinations of the foregoing. Exemplary antioxidants include without limitation, at least one of natural mixed tocopherols, rosemary extract, ascorbyl palmitate, ascorbic acid, citric acid, glycolic acid, butylated hydroxyanisole ("BHA"), butylated hydroxytoluene ("BHT"), tertiary butylhydroquinone ("TBHQ"), and ethoxyquine ("EQ"), and combinations of the foregoing. Exemplary flavorings include natural and/or artificial flavorings.

EXAMPLE 1

Formulation of an Exemplary Formula for the Food Delivery System

An exemplary formula, which is oil based, and which is particularly well adapted as food for fish, is depicted below in Table 1.

TABLE 1

| % Active Ingredient | Ingredient | Description/Sourcing |
|---|---|---|
| 47.96 | Soybean oil | Phytol SOY (Custom Ingredients) |
| 3.00 | Beeswax | Synthetic Beeswax (Strahl & Pitsch) |
| 49.00 | Wheat flour, soybean meal, fish meal, ground corn, brewers yeast, fish oil, marine algae, spirulina, vitamin supplement, mineral supplement, ethoxyquin | Vegetable Blend 170 (Aquadine) |
| 0.04 | Vegetable oil, natural mixed tocopherols, lecithin, rosemary extract | Naturox ® (Kemin) or ParaMega (Kemin) |

This exemplary formula comprises a specific gravity of about 1.06, and has a viscosity of about 10,000 to about 80,000 centipoises after 24 hours at 25 degrees Celsius.

EXAMPLE 2

Formulation of Another Exemplary Formula for the Fish Food Delivery System

Another exemplary formula, which is also oil based, and which is particularly well adapted as food for fish, is depicted below in Table 2.

TABLE 2

| % Active Ingredient | Ingredient | Description/Sourcing |
|---|---|---|
| 47.96 | Soybean oil | Phytol SOY (Custom Ingredients) |
| 3.00 | Beeswax | Synthetic Beeswax (Strahl & Pitsch) |
| 49.00 | Herring meal, wheat flour, spirulina, shrimp meal, soybean meal, fish oil, marine algae, vitamin supplement, mineral supplement, ethoxyquin | Spirulina Blend 140 (Aquadine) |
| 0.04 | Vegetable oil, natural mixed tocopherols, lecithin, rosemary extract | Naturox ® (Kemin) or ParaMega (Kemin) |

This exemplary formula comprises a specific gravity of about 1.06, and has a viscosity of about 10,000 to about 80,000 centipoises after 24 hours at 25 degrees Celsius.

The present invention has several benefits over the prior art. For example, the underwater food delivery system of the present invention allows a user to readily control the amount of food dispensed while the user is underwater. Additionally, the handle of the present invention better ensures that the system will not dislodge from a user, and therefore, become lost underwater, thereby potentially contaminating the underwater environment. The handle is further nonrestrictive such that the user can readily manipulate the system while the system is secured to the user. Also, the present invention controls the flow of water and other contaminants in and out of system such that the food composition is not tainted or diluted. Additionally, the food composition of the present invention is sufficiently viscous and non-soluble such that it will not readily disperse or dissolve once in contact with the aqueous environment. For all of these reasons, the present invention allows a user to directly interact with aquatic life while the user is engaged in underwater activities.

What is claimed is:

1. A method for the submerged underwater feeding of aquatic life by a user comprising steps of
   a. providing an underwater food delivery system for the dispensing of aquatic food composition in an aqueous environment including;
      a receptacle for holding the aquatic food composition, the receptacle having a front side opposite to a back side, a first lateral side opposite to a second lateral side, and a top and a bottom portion;
      the top portion having a flange with at least one of an arched geometry or rounded corners so as to reduce the likelihood of injury to a user;
      a loop handle secured to the receptacle;
      wherein the receptacle comprises a collapsible metallized material, and both the receptacle and the handle comprise a phosphorescent material;
      wherein the receptacle comprises a gateway for the controlled egress of the aquatic food composition from the receptacle, and wherein the gateway comprises a one-way valve to prevent a flow of water into the receptacle;
   further comprising the steps of
   b. attaching the food delivery system to a user by looping the handle around the user's wrist,
   c. submerging the food delivery system underwater in the presence of aquatic life,
   d. while underwater, squeezing the receptacle releasing a desired amount of the aquatic food composition for consumption by aquatic life, and
   e. stop squeezing the receptacle to stop the egress of aquatic food composition and preserve the remaining food composition in the system while simultaneously preventing a flow of water from the aqueous environment into the receptacle.

* * * * *